K. GOLDSCHMIDT & J. WEBER.
PROCESS OF DETINNING.
APPLICATION FILED SEPT. 19, 1908.
Reissued May 11, 1909. 12,956.
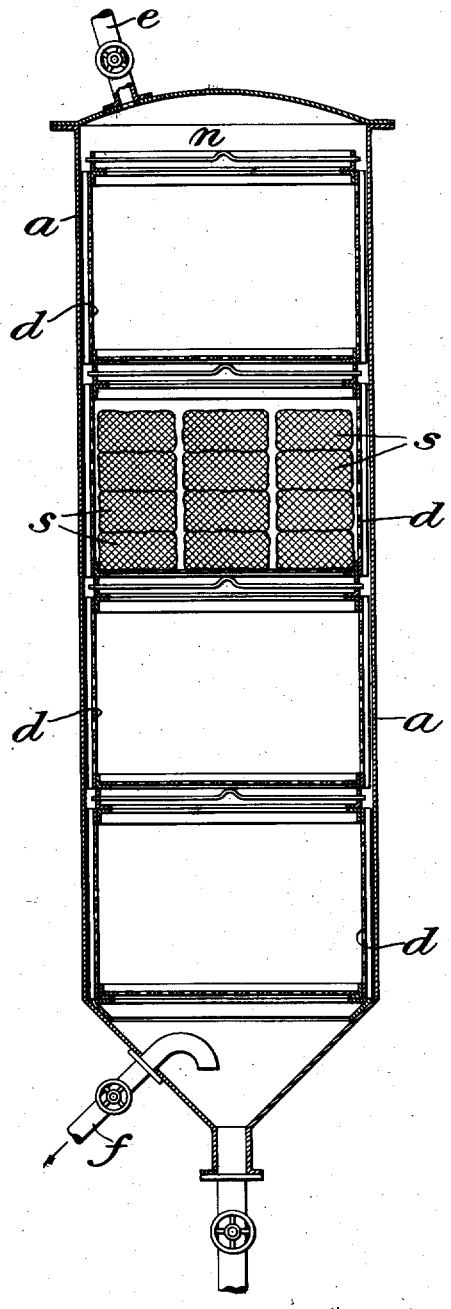
Witnesses:
Chas. F. Clagett
J. B. Le Blanc.
Inventors
Karl Goldschmidt
Josef Weber
By their Attorney
Chas. F. Dawe

UNITED STATES PATENT OFFICE.

KARL GOLDSCHMIDT AND JOSEF WEBER, OF ESSEN-ON-THE-RUHR, GERMANY, ASSIGNORS, BY MESNE ASSIGNMENTS, TO GOLDSCHMIDT DETINNING COMPANY, OF JERSEY CITY, NEW JERSEY, A CORPORATION OF NEW JERSEY.

PROCESS OF DETINNING.

No. 12,956. Specification of Reissued Letters Patent. Reissued May 11, 1909.

Original No. 831,223, dated September 18, 1906, Serial No. 267,579. Application for reissue filed September 19, 1908. Serial No. 453,887.

*To all whom it may concern:*

Be it known that we, KARL GOLDSCHMIDT and JOSEF WEBER, subjects of the King of Prussia, German Emperor, and residents of Essen-on-the-Ruhr, in the Province of the Rhine, German Empire, have jointly invented certain new and useful Improvements in the Process of Detinning, of which the following is a specification.

Our invention consists in subjecting the tin scraps in a compressed state in a closed vessel to the action of a detinning reagent, such as chlorin gas, and in altering the pressure in the vessel or receptacle when the reaction of the chlorin on the scraps takes place. A chief point of our invention is to submit the tin scraps in a firmly compressed state to the action of a detinning reagent, such as chlorin. It has been found that the chlorin gas enters into the narrowest and the most closed spaces between the compressed tin scraps and mixes easily with the air contained therein, so that even between the closely-packed surfaces of the tin scraps a sufficient action of the chlorin gas takes place. The chlorin gas is not employed in a pure state, but mixed with neutral or inert gases, as dry air, and so on.

It is of importance to avoid in the process high temperatures in the mass of the tin scraps and to use the tin scraps in a well-dried state. By this process we get the iron waste perfectly detinned and with a fine smooth gray surface.

The apparatus used in this process is illustrated in the accompanying drawing in a vertical cross-section.

The receptacle for the compressed tin scraps is marked *a* and is of course made of a material which is not affected by chlorin gas or anhydrous chlorid of tin. Preferably an iron vessel is used. The tin scraps are mechanically compressed, so that they form bundles *s*, and the receptacle *a* is filled with these compressed bundles *s* of tin scraps. The bundles are compressed and of such a size that they can afterward be directly used in steel works. These bundles may conveniently be, for instance, forty centimeters to sixty centimeters in width and length and eight to fourteen centimeters in height, so that they have a weight from about fifty to sixty kilograms. In order to facilitate the filling of the vessel, the packets are brought in baskets, and these baskets, filled with the bundles of compressed tin scraps, are then introduced into the vessel.

After the apparatus *a* has been filled with the bundles of tin scraps and the apparatus being under ordinary pressure the chlorin gas is admitted from above through the pipe *e*. The chlorin gas being under a certain overpressure above ordinary pressure is at first diffused in the upper free space *n* over the baskets *d* and is there mixed with the air of the apparatus. The mixture of chlorin gas and air acts upon the baskets or bundles of compressed tin scraps, and the chlorin gas is now constantly absorbed by the tin on the tin scraps. As soon as the chlorin gas is absorbed and has formed chlorid of tin naturally new parts of chlorin gas come in reaction and are mixed with the air contained in the vessel, and so the mixture is again enriched by freshly admitted and diffused chlorin gas. Now the process is so guided that the pressure in the vessel is augmented, so that at the end of the operation the overpressure—for instance, of one atmosphere above the ordinary pressure—is obtained. By the increasing of the pressure in the vessel the chlorin gas comes in contact with all the surfaces of the tin scraps, so that even between the most closely packed surfaces of the tin scraps a sufficient action of the chlorin gas and formation of chlorid of tin takes place. At the commencement of the operation the chlorin gas when passing over the firmly-compressed waste will naturally be eagerly taken up by the tin on account of its great affinity for the latter; but as soon as the leading action of the chlorin gas has taken place at the easily-accessible parts of the tin scraps the reaction will slow down, and so the parts of the tin scraps which are firmly compressed and where the surfaces are in close contact with one another might easily remain unaffected; but the mixture of chlorin and air is driven by the increasing pressure into the narrowest channels or interstices of the tin scraps, so that the whole surfaces are detinned. It is easily to be seen that the increasing of the pressure in the vessel is of great importance for finishing the detinning process completely and in a short time.

It is important to avoid a great increase of temperature.

Instead of increasing the pressure in the vessel it is possible to diminish the same and then to increase it again. For example, the process can be carried out in the following manner: At first the vessel when filled with tin scraps is closed and then evacuated by an air-pump connected with the pipe *f*. (Not shown.) Then the chlorin gas is mixed with air admitted to the vessel through the pipe *e*, so that at least the common pressure in the vessel results or so that a slight overpressure is obtained. Then we can again pump out the mixture of air and chlorin gas or the air which fills the vessel after the chlorin gas has been absorbed by the tin, and we may introduce again chlorin gas mixed with air into the vessel until the common pressure in the vessel results.

It is of great importance to use the tin scraps in a strongly-compressed state, which can of course be effected by mechanical means only. Then it is possible to pack the tin scraps in strong bundles of fifty to sixty kilograms—for instance, into baskets or crates—so that the vessel in which the process is carried out contains several tons of tin scraps. Thereby the cost of labor, which is an essential factor in all such processes, is greatly reduced.

The stronger the tin scraps have been compressed the stronger must be the change in pressure, because only under this varied pressure the chlorin gas will easily enter the narrowest interstices or channels and change the tin quickly and completely into tetrachlorid of tin. As already said, the pressure may be decreased or increased in the process, but always a varying of the pressure must take place.

By the term "inert gas" used in the description and in the following claims we mean a gas which does not attack the scrap or chlorin or any of the products thereof during the process of detinning.

Having thus fully described the nature of our invention, what we desire to secure by Letters Patent of the United States is—

1. Process of detinning, which consists in compressing loose tin-scrap and treating said compressed scrap in a vessel with chlorin gas.

2. Process of detinning, which consists in compressing loose tin-scrap into compact bundles of relatively small size, and treating said bundles in a vessel with chlorin gas.

3. Process of detinning, which consists in compressing loose tin-scrap and treating said compressed scrap in a vessel with chlorin gas in combination with an inert gas.

4. Process of detinning which consists in compressing loose tin-scrap into compact bundles of relatively small size, and treating said bundles in a vessel with chlorin gas in combination with an inert gas.

5. Process of detinning, which consists in treating tin-scrap in a vessel with chlorin gas and altering the pressure in the vessel during the detinning.

6. Process of detinning, which consists in treating tin-scrap in a vessel with chlorin gas, and increasing the pressure in the vessel during the detinning.

7. Process of detinning, which consists in treating tin-scrap in a vessel with chlorin gas, and increasing the pressure in the vessel during the detinning, and then diminishing it.

8. Process of detinning, which consists in treating tin-scrap in a vessel with chlorin gas in combination with an inert gas, and altering the pressure in the vessel during the detinning.

9. Process of detinning, which consists in treating tin-scrap in a vessel with chlorin gas in combination with an inert gas, and increasing the pressure in the vessel during the detinning.

10. Process of detinning, which consists in treating tin-scrap in a vessel with chlorin gas in combination with an inert gas, and increasing the pressure in the vessel during the detinning and then diminishing it.

11. Process of detinning, which consists in compressing loose tin-scrap and treating said compressed scrap in a vessel with chlorin gas, and altering the pressure in the vessel during the detinning.

12. Process of detinning, which consists in compressing loose tin-scrap and treating said compressed scrap in a vessel with chlorin gas, and increasing the pressure in the vessel during the detinning.

13. Process of detinning, which consists in compressing loose tin-scrap and treating said compressed scrap in a vessel with chlorin gas, and increasing the pressure in the vessel during the detinning and then diminishing it.

14. Process of detinning, which consists in compressing loose tin-scrap and treating said compressed scrap in a vessel with chlorin gas, in combination with an inert gas, and altering the pressure in the vessel during the detinning.

15. Process of detinning, which consists in compressing loose tin-scrap and treating said compressed scrap in a vessel with chlorin gas, in combination with an inert gas, and increasing the pressure in the vessel during the detinning.

16. Process of detinning, which consists in compressing loose tin-scrap and treating said compressed scrap in a vessel with chlorin gas, in combination with an inert gas, and increasing the pressure in the vessel during the detinning and then diminishing it.

17. The process of detinning, which consists in subjecting compressed tin scrap to the action of a detinning reagent, and forcing the reagent into the interstices of the scrap during the detinning.

18. The process of detinning, which consists in subjecting tin scrap to the action of a gaseous detinning reagent, and forcing the reagent into the interstices of the scrap during the detinning.

19. The process of detinning, which consists in subjecting compressed tin scrap to the action of chlorin gas, and forcing the reagent into the interstices of the scrap during the detinning.

20. The process of detinning, which consists in subjecting compressed tin scrap to the action of a detinning reagent, and forcing the reagent into the interstices of the scrap by varying the pressure during the detinning.

21. The process of detinning, which consists in subjecting compressed tin-scrap to the action of a detinning reagent, and forcing the reagent into the interstices of the scrap by pressure increased during the detinning.

22. The process of detinning, which consists in subjecting compressed tin-scrap to the action of a detinning reagent, and forcing the reagent into the interstices of the scrap by superatmospheric pressure.

23. The process of detinning, which consists in subjecting compressed tin-scrap in a closed vessel to the action of a detinning reagent, and increasing the pressure in the vessel during the detinning.

24. The process of detinning, which consists in subjecting compressed tin-scrap in a closed vessel to the action of a detinning reagent, increasing the pressure in the vessel during the detinning, and then decreasing the pressure.

25. The process of detinning, which consists in subjecting compressed tin-scrap in a closed vessel to the action of a detinning reagent, and successively decreasing and increasing the pressure in the vessel during the detinning.

26. The process of detinning, which consists in subjecting compressed tin-scrap in a closed vessel to the action of a detinning reagent, successively decreasing and increasing the pressure in the vessel during the detinning, and again decreasing the pressure.

In witness whereof we have hereunto set our hands in the presence of two witnesses.

KARL GOLDSCHMIDT. [L. S.]
JOSEF WEBER. [L. S.]

Witnesses:
OTTO KÖNIG,
WM. WASHINGTON BRUNSWICK.